US009512344B2

(12) United States Patent
Li et al.

(10) Patent No.: US 9,512,344 B2
(45) Date of Patent: Dec. 6, 2016

(54) THERMALLY ADAPTIVE DUCTILE CONCRETE

(71) Applicant: THE REGENTS OF THE UNIVERSITY OF MICHIGAN, Ann Arbor, MI (US)

(72) Inventors: Victor C. Li, Ann Arbor, MI (US); Devki Desai, Bloomfield, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/768,049

(22) PCT Filed: Feb. 14, 2014

(86) PCT No.: PCT/US2014/016424
§ 371 (c)(1),
(2) Date: Aug. 14, 2015

(87) PCT Pub. No.: WO2014/127208
PCT Pub. Date: Aug. 21, 2014

(65) Prior Publication Data
US 2015/0376489 A1    Dec. 31, 2015

Related U.S. Application Data

(60) Provisional application No. 61/765,234, filed on Feb. 15, 2013.

(51) Int. Cl.
| | | |
|---|---|---|
| *C04B 16/06* | (2006.01) | |
| *C04B 24/08* | (2006.01) | |
| *C04B 22/06* | (2006.01) | |
| *C09K 5/14* | (2006.01) | |
| *C04B 28/04* | (2006.01) | |
| *C04B 14/48* | (2006.01) | |
| *C04B 16/00* | (2006.01) | |
| *C04B 20/00* | (2006.01) | |
| *C04B 111/00* | (2006.01) | |

(52) U.S. Cl.
CPC ............... *C09K 5/14* (2013.01); *C04B 14/48* (2013.01); *C04B 16/00* (2013.01); *C04B 16/06* (2013.01); *C04B 16/0625* (2013.01); *C04B 16/0633* (2013.01); *C04B 16/0641* (2013.01); *C04B 20/0048* (2013.01); *C04B 28/04* (2013.01); *C04B 2111/00318* (2013.01); *C04B 2201/32* (2013.01); *Y02W 30/92* (2015.05)

(58) Field of Classification Search
CPC ........ C04B 14/48; C04B 14/062; C04B 18/08; C04B 28/04; C04B 16/00; C04B 16/06; C04B 16/0625; C04B 16/0633; C04B 16/0641; C04B 20/0048; C04B 20/10; C04B 24/08; C04B 24/36; C04B 2111/00318
See application file for complete search history.

(56) References Cited

U.S. PATENT DOCUMENTS

| | | | |
|---|---|---|---|
| 4,988,543 A | 1/1991 | Houle et al. | |
| 6,296,699 B1 | 10/2001 | Jin | |
| 8,070,876 B1* | 12/2011 | Jiang | .................... C04B 20/1033 106/638 |
| 2005/0228081 A1* | 10/2005 | Uchida | .................... C04B 28/02 524/2 |
| 2009/0223160 A1 | 9/2009 | Hittle et al. | |
| 2011/0089386 A1 | 4/2011 | Berry et al. | |
| 2011/0259246 A1 | 10/2011 | Guynn et al. | |
| 2013/0034732 A1 | 2/2013 | Parker et al. | |

FOREIGN PATENT DOCUMENTS

| | | | |
|---|---|---|---|
| CN | 101074157 A | * | 11/2007 |
| CN | 102584322 A | * | 7/2012 |
| WO | 0061360 A1 | | 10/2000 |

OTHER PUBLICATIONS

Derwent-Acc-No: 2013-B92258, abstract of Korean Patent Specification No. KR 2013010575 A (Jan. 2013).*
International Search Report and Written Opinion for PCT/US2014/016424, mailed May 26, 2014; ISA/KR.
ACI Materials Journal, Title No. 99-M47, "Interface Tailoring for Strain-Hardening Polyvinyl Alcohol-Engineered Cementitious Composite (PVA-ECC)," Sep.-Oct. 2002, Victor C. Li et al.
Journal of Advanced Concrete Technology, vol. 6, No. 1, pp. 181-193, "Fiber-Bridging Constitutive Law of Engineered Cementitious Composites," Feb. 2008, Yang et al.
Materials and Structures, "Rheology, Fiber Dispersion, and Robust Properties of Engineered Cementitious Composites," Jul. 2012, Li et al.
Composites: Part B, 56, pp. 536-545, The Role of Flaw Size and Fiber Distribution on Tensile Ductility of PVA-ECC, Sep. 2013, Tosun-Felekoglu et al.

* cited by examiner

Primary Examiner — Anthony J Green
(74) Attorney, Agent, or Firm — Harness, Dickey & Pierce, PLC

(57) ABSTRACT

A Thermally Adaptive Ductile Concrete (PCM-ECC) having a tensile ductility ceramic with 5 times the thermal resistance, 2 times the specific heat capacity, and 400 times the tensile strain capacity of regular concrete.

15 Claims, 5 Drawing Sheets

THERMALLY ADAPTIVE DUCTILE CONCRETE

CROSS-REFERENCE TO RELATED APPLICATIONS

This application claims the benefit of U.S. Provisional Application No. 61/765,234, filed on Feb. 15, 2013. The entire disclosure of the above application is incorporated herein by reference.

FIELD

The present disclosure relates to concrete and, more particularly, relates to thermally adaptive ductile concrete.

SUMMARY

This section provides a general summary of the disclosure, and is not a comprehensive disclosure of its full scope or all of its features.

The present teachings provide a cementitious composite for architectural elements featuring a combination of mechanical (tensile ductility) and thermal (adaptive heat capacity and thermal conductivity) performance not previously possible. The composite is a Thermally Adaptive Ductile Concrete (PCM-ECC) that possesses a tensile ductility ceramic with 5 times the thermal resistance, 2 times the specific heat capacity at 23° C., and 400 times the tensile strain capacity of regular concrete. Additional benefits of the composite include a density approximately 25% lower than conventional concrete and a compressive strength well in the structural concrete range.

The high tensile ductility of PCM-ECC provides durability particularly when cast into slender geometries. It is notable that after loaded past the tensile strength, the residual crack widths are on the order of only 10 microns.

To provide passive heat storage in buildings, materials exhibiting a phase-change within building operating temperature can be incorporated into the envelope material. This study assesses the viability of incorporating a paraffin wax-based, phase change material (PCM) into an Engineered Cementitious Composite (ECC). ECC allows formation of thin panels—a favorable geometry for building façades. Inclusion of 3% PCM by mass provided a 40% increase in ECC heat capacity at phase change temperature while maintaining a 28 MPa compressive strength, and a 4% tensile strain capacity on average.

With this new material, architectural elements can be made thin, with reduced or no steel reinforcement, and can be made flat or curved. It can be used to store heat when exterior temperature is high and release heat when temperature falls, thus reducing loading on building HVAC systems, and increasing human comfort. The new material is also pigmentable.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
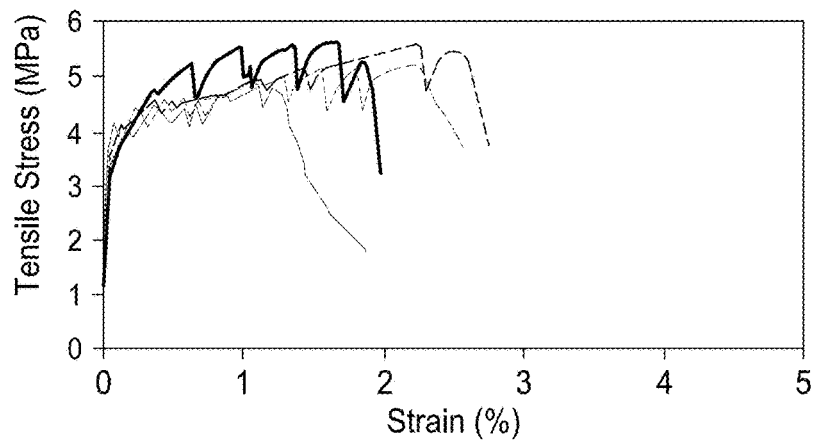

FIG. 6 provides a diagram of tensile stress-strain behavior of 0% PCVM-ECC.

Figure 7:
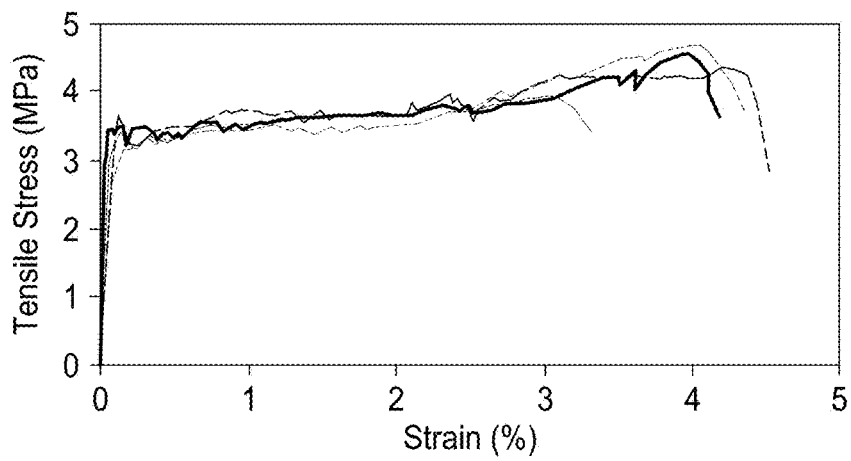

FIG. 7 provides a diagram of tensile stress-strain behavior of 3% PCM-ECC.

Figure 8:
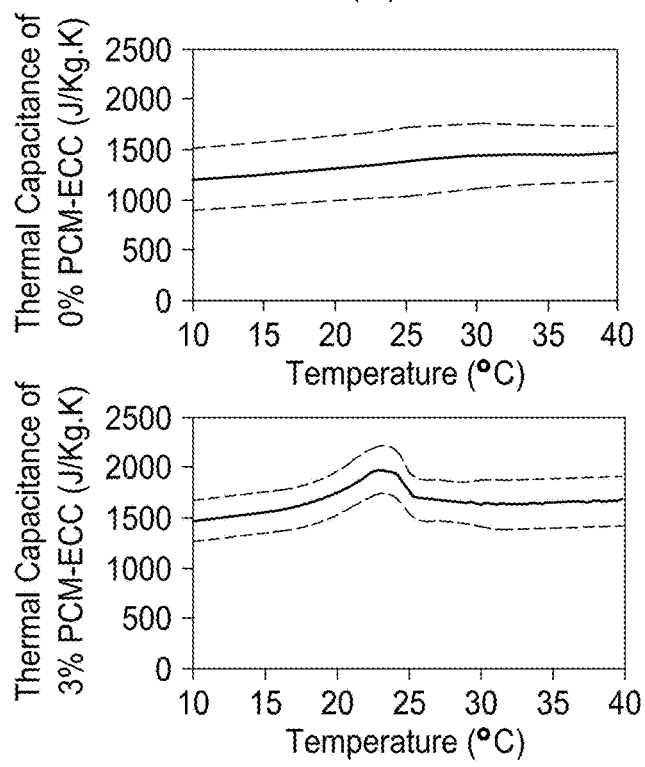

FIG. 8 is a series of graphs illustrating the specific heat capacity profile of 0% and 3% PCM-ECC.

Figure 9:
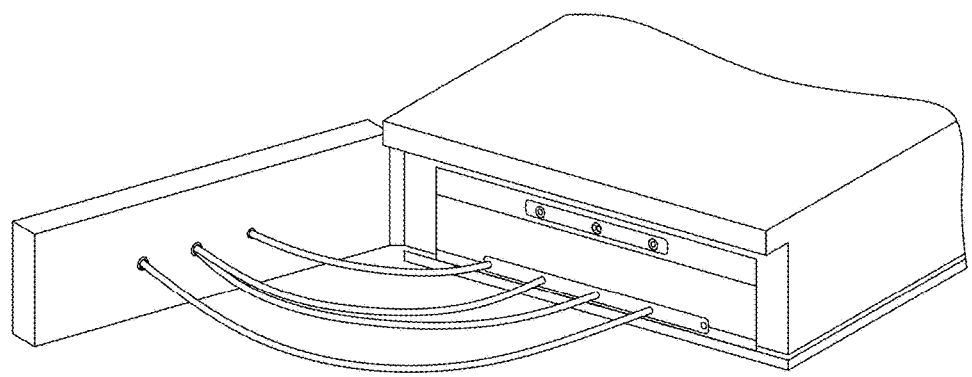
Figure 9:
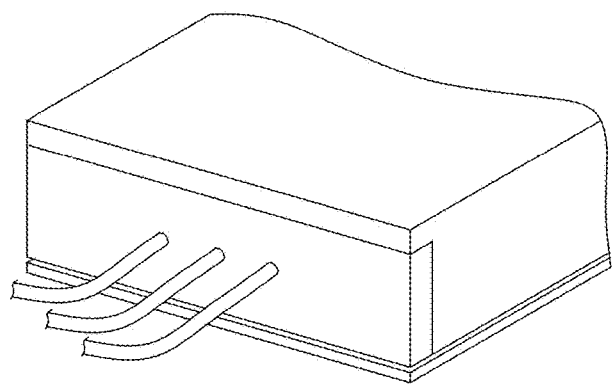

FIG. 9 is a series of photographs illustrating the thermal resistance test setup and apparatus during data collection.

Figure 10:
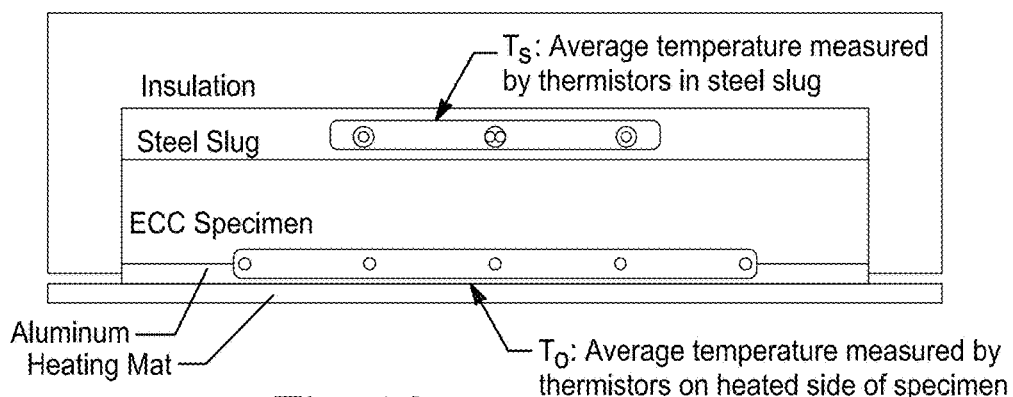

FIG. 10 is a schematic cross-sectional image of the thermal resistance test setup.

Figure 11:
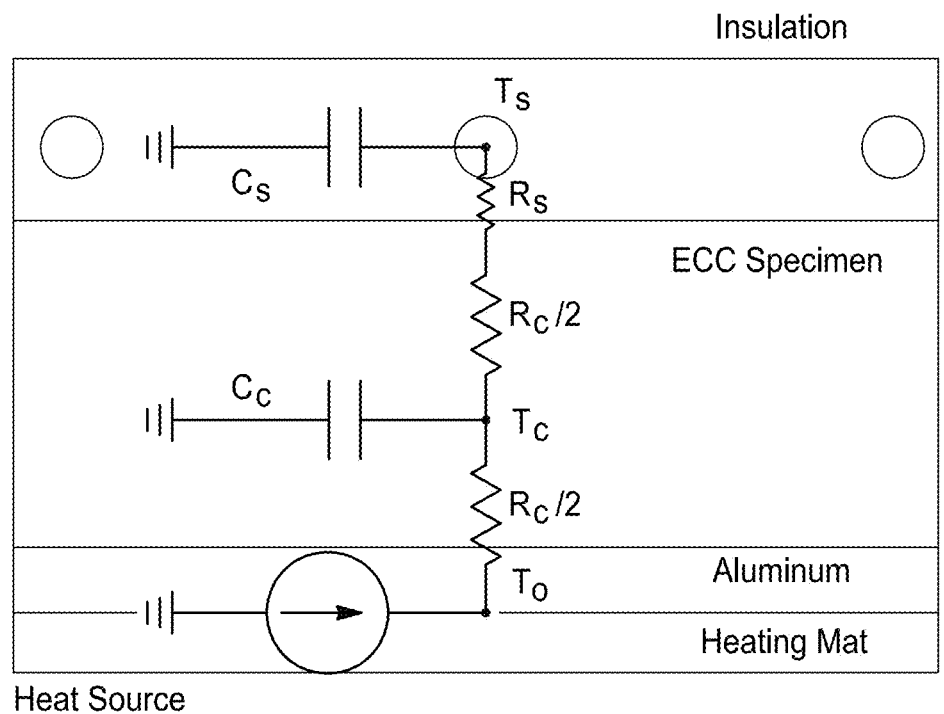

FIG. 11 is a diagram of the thermal equivalent circuit used to model heat transfer during the thermal resistance experiment.

Figure 12:
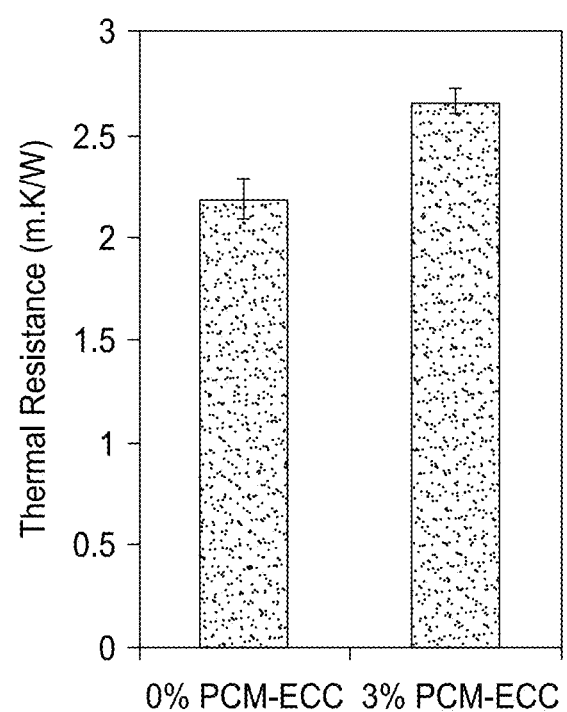

FIG. 12 is a graph illustrating the thermal resistance of 0% and 3% PCM-ECC.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The objective of the present cementitious composite is to provide a means of casting thin panels for building envelopes which can adapt thermally to temperature, thereby stabilizing interior building temperature profiles. This is accomplished by incorporating a phase change material (PCM) with a melting point near indoor comfort temperature into an Engineered Cementitious Composite (ECC), a high-performing class of concretes with high tensile ductility. The combination provides a material with the mechanical properties necessary to be cast as curved or flat, thick or thin panels, and a thermal capacitance which peaks at indoor comfort temperature (generally in the range of about 18-26° C.). This peak in thermal capacitance allows the composite to rapidly absorb heat as its temperature rises in excess of 23° C., delaying a rise in building temperature, and release heat as its temperature drops below this value, again helping indoor temperature to stay within a comfortable range.

In the past, PCM has been incorporated into gypsum wallboard for interior walls, polymer foam for wall cavities, and conventional concrete for heavy thermal massing. PCM-ECC seeks to fill the current void of thermally adaptive materials which can be cast into thin, free-form panels for external or internal architectural use.

I. Introduction

Approximately 40% of home energy use, the greatest percentage in comparison to other uses, is dedicated to space heating and cooling in the United States. However, much of this energy is ultimately lost through the building envelope. Thus, in the field of building design, much effort has been dedicated to passive heat storage strategies such as roof ponds and thermal storage walls. A common theme amongst many of the design strategies is the utilization of high thermal mass in the building envelope to delay the transfer of heat across the external walls.

High thermal mass in a building component can be achieved by increasing the mass of material used or by increasing the specific heat capacity of the material. As concrete is a ubiquitous façade material, this study focused on the feasibility of increasing its specific heat capacity so that the thermal mass in concrete envelopes can be increased without increasing the mass of concrete used.

One manner of increasing the heat capacity of a composite material is introducing a component which undergoes a phase change within building operating temperature. This is because as a material undergoes a phase change from solid to liquid, heat is consumed to break chemical bonds. The opposite occurs as the material resolidifies; it releases heat to its surroundings as bonds reform. This provides a passive means of heat storage within the material.

There are a number of phase change materials (PCMs) which have been considered for integration into building components such as hydrated salts, fatty acids and paraffin. Although any one of the aforementioned PCMs may be used in connection with the present teachings, it has been found that advantages provided by paraffin waxes include the availability of paraffins with melting temperatures around indoor comfort temperature, their low cost, and their low thermal conductivity. The latter lends an insulative effect in addition to the thermal storage of phase change.

According to the principles of the present teachings, paraffin PCM has thus far been successfully incorporated into self-compacting concrete. The type of concrete chosen as the matrix for the paraffin PCM in this study is an Engineered Cementitious Composite (ECC). ECC was chosen due to its potential to be cast into thin panels for building envelopes without the need for reinforcing bars. ECC can also be made pigmentable, allowing adjustment of external reflectivity and aesthetic. Further, ECC can be used as a façade or structural material due to its compressive strength and tensile ductility.

In some embodiments, the PCM incorporated into the ECC is a microencapsulated paraffin dispersion manufactured by BASF chemical, Micronal DS5007x. The microcapsules, 5 µm diameter on average, comprise 41-43% of the dispersion according to the supplier. In some embodiments, incorporation of 3% PCM by mass (relative to the total mass of the remaining components of the ECC mixture) into ECC results in a 40% increase in the specific heat capacity of the composite at phase change temperature as compared to the specific heat capacity of ECC alone.

The components of ECC include cement, pozzolanic materials, such as fly ash, fine aggregate and fiber reinforcement, often polymer fiber. In some embodiments, metallic fibers can be used. The mix proportions are dictated by micromechanical principles in order to achieve the optimal balance between parameters such as matrix toughness and fiber-matrix bond, allowing the concrete to provide tensile strength and ductility as well as compressive strength.

TABLE 1

PCM-ECC batch proportions. All proportions provided as mass with respect to cement content.

| Batch Name | Type 1 Cement | Fly Ash (Class F) | Sand (P-110) | Water | Superplasticizer* | PVA fiber** | PCM dispersion |
|---|---|---|---|---|---|---|---|
| 0% PCM-ECC | 1 | 2 | 1.11 | 0.79 | 0.02 | 0.06 | 0.00 |
| 3% PCM-ECC | 1 | 2 | 1.11 | 0.67 | 0.02 | 0.06 | 0.36 |

*ADVA 405 from W. R. Grace.
**12 mm in length with a 40 micron diameter and a 1.2% oil coating.

The aim of the present teachings is to determine whether a microencapsulated paraffin PCM can be incorporated into an ECC mix and deliver a significant improvement in heat capacity and thermal resistance while retaining mechanical integrity.

2. Material Design 2.1 Mix Proportions

The materials used in the design of PCM-ECC are type 1 cement, class F fly ash, fine silica sand, water, poly-vinyl alcohol (PVA) fiber, superplasticizer, and a PCM dispersion. The PCM dispersion contains microencapsulated paraffin wax with a melting point of 23° C. In some embodiments, as indicated in Table 1, the poly-vinyl alcohol is oil-coated. Moreover, in some embodiments, the fibers can have an average diameter of 10-100 microns and an average length of 5-15 mm, an average diameter of 30-50 microns and an average length of 8-12mm, an average diameter of 10-100 microns and an average length of 8-12mm, and/or an average diameter of 30-50 microns and an average length of 5-15 mm.

Two mixes will be discussed in this document: a control 0% ECC mix and a 3% PCM-ECC mix, proportions of which are provided in Table 1. The control mix was created to serve as a matrix conducive to inclusion of PCM, rather than as an optimal ECC design. It was hypothesized that the addition of PCM would lower the matrix toughness of ECC, lowering the composite compressive and tensile strength. Thus, a high-reactivity class F fly ash, with 14% calcium oxide content was utilized to raise the matrix toughness beyond the desired level in the control mix. Preliminary mechanical testing determined this mix design, an appropriate ECC basis for PCM inclusion, and is referred to as 0% PCM-ECC in Table 1.

In determining the proportion of PCM to include, it is important to acknowledge that PCM content and the compressive strength exhibit an inverse correlation. With base mix proportions of Table 1, the tensile strain capacity is optimized at 3% inclusion of PCM by mass likely due to an optimal balance between micromechanical parameters such as matrix toughness and fiber-matrix bond. For demonstration purposes, 3% PCM-ECC will be discussed due to its advantageous mechanical and thermal properties.

The 3% PCM-ECC mix incorporates 3% microencapsulated paraffin by mass, and adjusts the water content to account for water added via the dispersion. It should be understood that although a 3% PCM by mass embodiment is discussed, alternative compositions including PCM are anticipated by the present teachings. It is likely that based upon the properties of the initial matrix such as density and fracture toughness, mass percentages less than about 10% PCM could be found appropriate.

The water and superplasticizer content were dictated by obtaining the necessary rheology for optimal fiber dispersion in addition to workability requirements. Mini-cone flow rate tests were conducted on the fiberless matrix of all batches tested, and the water and superplasticizer content were adjusted to provide a flow rate of 24-33 seconds as recommended by Li, M. and Li, V. C. in "Rheology, fiber dispersion, and robust properties of Engineered Cementitious Composites," Materials and Structures, DOI:10:1617/s11527-012-9909-z, 2012. It is noteworthy that the superplasticizer content was limited by its tendency to cause segregation of ECC matrix components during mixing at higher concentrations.

It was hypothesized that the addition of PCM would lower the matrix toughness of ECC, lowering the composite compressive and tensile strength. Thus, a high-activity class F fly ash was utilized to raise the matrix toughness beyond the desired amount in the control mix, and counteract the hypothesized effect of PCM inclusion in the 3% PCM-ECC mix.

2.2 Scanning Electron Microscopy

In order to determine whether the PCM microcapsules were ruptured in the mixing and curing processes, scanning electron microscopic (SEM) images were taken of a cured 3% PCM-ECC specimen. A Quanta 200 3D apparatus was utilized for this process.

Figure 1:
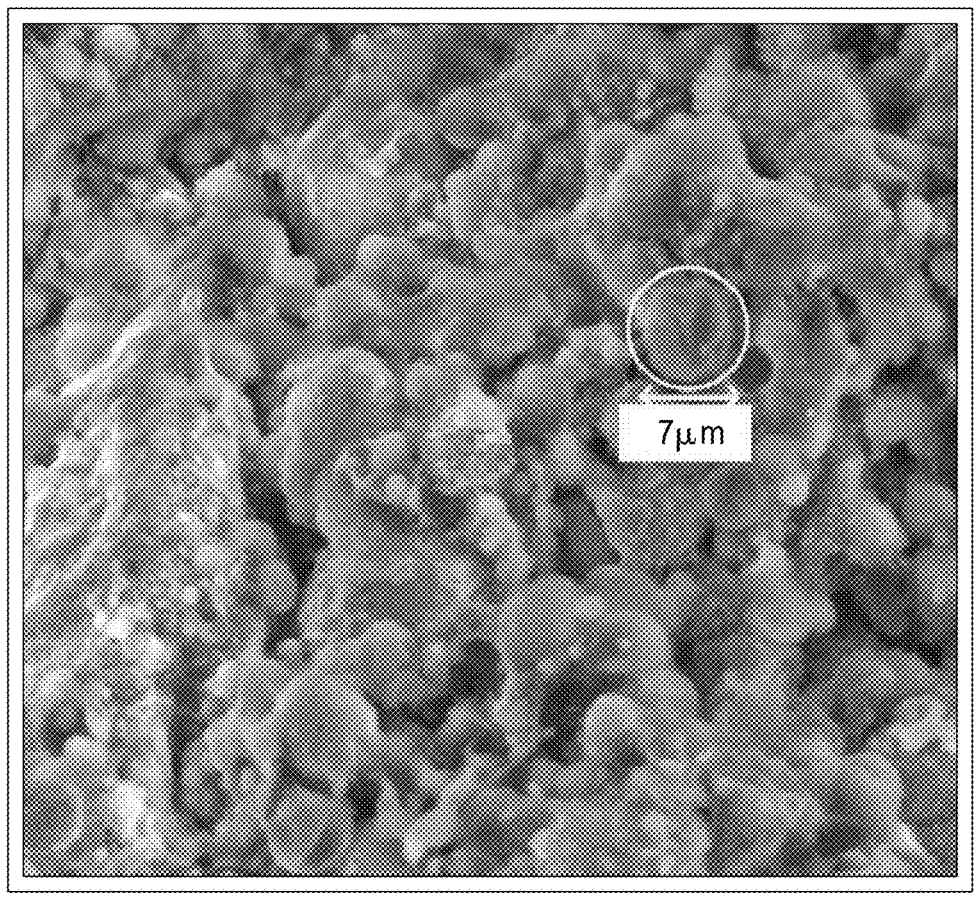
FIG. 1 is a scanning electron microscopic (SEM) image of a 3% PCM-ECC specimen, specifically identifying the location and diameter of one PCM capsule within the specimen.

FIG. 1 provides an SEM image. It shows numerous PCM capsules which appear to be unruptured by the mixing and curing process. The capsules are 5 µm in diameter on average and resemble crumpled spheres prior to addition to the matrix. The capsules seem to retain this geometry within cured ECC.

We can also observe the PCM particles amidst other components of the ECC matrix. Smooth, spherical fly ash particles, 0.2-100 µm in diameter are visible. The topology created by a buried PVA fiber near the left side of the frame can also be seen, as well as an interconnected system of dark capillary pores.

The SEM imaging process also allows us to observe the distribution of PCM capsules within the matrix. Based upon FIG. 1, we can see that the capsules dispersed rather than clumped. The differential scanning calorimetry results discussed in a subsequent section seem to support this observation.

3. Mechanical Testing 3.1 Compressive Strength

Figure 2:
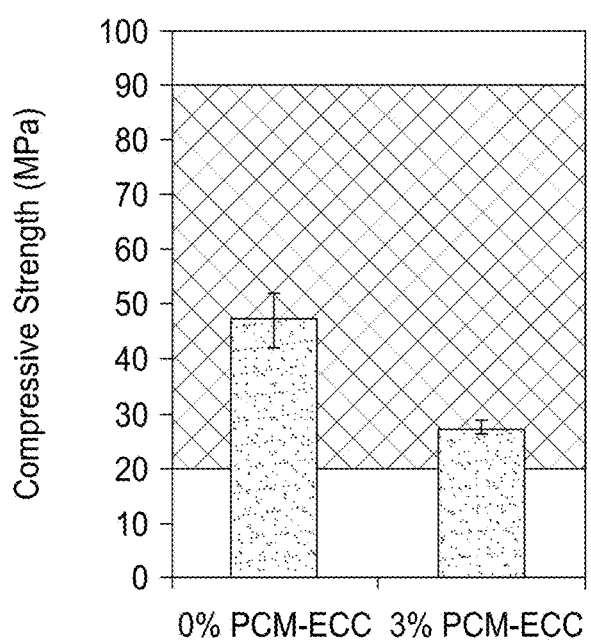
FIG. 2 is a graph that provides a comparison of compressive strength between 0% and 3% PCM-ECC.

The 28-day compressive strength of control 0% PCM-ECC and 3% PCM-ECC were tested using cubes with 50.8 mm sides, testing three cubes per mix design. The results are shown in FIG. 2. The typical range of compressive strength attainable with engineered cementitious composites is demarcated in grey for comparison.

The presence of PCM did lower the compressive strength of the ECC, from 47 MPa to 28 MPa, on average. This is likely due to a decrease in matrix toughness and/or an increase in initial flaw size. These could be caused by poor bonding between the PCM microcapsules and surrounding cement paste, as well as an increase in capillary pores created by the addition of water via the PCM dispersion.

According to the Portland Cement Association, the lower bound on compressive strength generally used for structural concrete is 17 MPa. If PCM-ECC is intended for use as a façade panel material, the compressive strength is sufficient, and it also has potential for structural use.

3.2 Tensile Behavior

Figure 3:
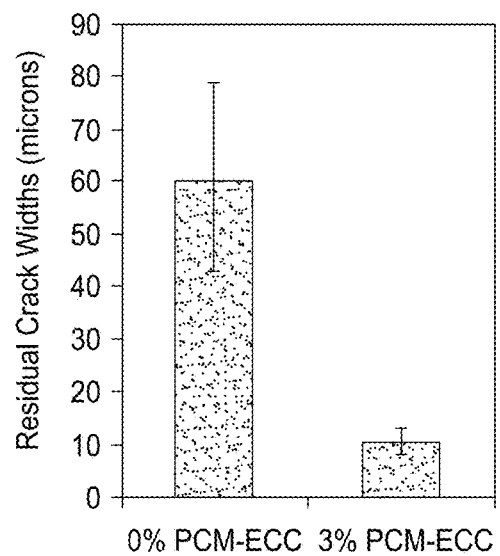
FIG. 3 is a graph that provides a comparison of residual crack widths of 0% and 3% PCM-ECC specimens after tensile testing according to Japan Society of Civil Engineers (JSCE) procedure.
Figure 4:
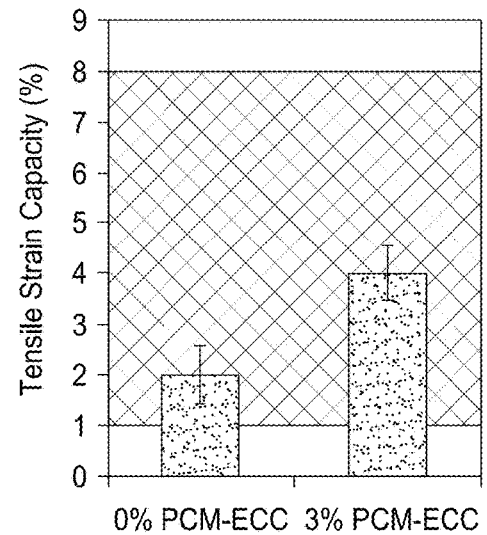
FIG. 4 illustrates the tensile strain capacity of 0% and 3% PCM-ECC.
Figure 5:
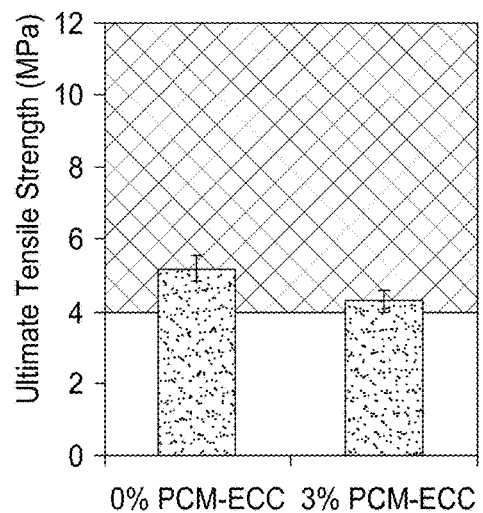
FIG. 5 illustrates the ultimate tensile strength of 0% PCM-ECC.

The availability of tensile strength and strain capacity is a benefit of using an ECC as opposed to conventional concrete. In this study, four dogbone-shaped specimens were cast per mix design and tested accordance with the Japan Society of Civil Engineers (JSCE) guidelines. The resulting 28-day tensile behavior is presented in FIGS. 3-5. While the first cracking tensile stress was 3 MPa on average for both 0% and 3% PCM-ECC, the behavior differed in terms of ultimate tensile strength, tensile strain capacity and residual crack widths. The presence of PCM reduced the ultimate tensile strength of the ECC from 5.2 to 4.3 MPa, but increased the tensile strain capacity from 2% to 4%. The increase in tensile strain capacity was achieved likely due to an improved balance between matrix toughness, fiber-matrix bond and other parameters once PCM was added. We can also see from FIG. 3, the residual crack widths after tensile testing decreased from 60 microns on average to 10 microns once PCM was added to the control mix.

4. Thermal Testing 4.1 Differential Scanning Calorimetry

The most important parameter to optimize when designing PCM-ECC is the specific heat capacity (SHC), the source of passive heat storage in the material. The SHC of 0% and 3% PCM-ECC was determined in accordance with ASTM E1269-11 Determining Specific Heat Capacity by Differential Scanning calorimetry (DSC). In this procedure, a small solid sample, 5-30 mg, is heated over the temperature range of interest, the heat flux into the specimen recorded during the process. For this application, all specimens were heated from 10° C. to 40° C. at a rate of 2° C. per minute. Four samples were tested for each ECC design, and the SHC of the mix was calculated as that of the average of the samples, as shown in FIG. 8.

In accordance with the ASTM standard, a baseline test and a reference test are conducted prior to testing the specimens of unknown heat capacity. The baseline test calls for subjecting an empty aluminum specimen pan to the chosen heating program, the results of which are used to subtract background heat flow from ECC specimen tests. A reference test is then conducted with the same heating rate, on a specimen with a known SHC profile: in this case, synthetic sapphire. Finally, the test is run on ECC samples, and the heat flow results are compared to those of the reference sample to determine the ECC SHC profile as detailed below.

Following ASTM E1269-11 procedure, the first step in data reduction is determining the calorimetric sensitivity function (E). This is necessary if heat flow calibration of the DSC apparatus is not performed prior to every test, but rather at regular servicing intervals. The value of E is based upon the chosen heating rate (b), the difference between the baseline and sapphire standard heat flux curves ($D_{st}$), the mass of the sapphire ($W_{st}$), and the specific heat capacity profile of the sapphire standard ($Cp_{st}$). The following equations are valid based upon the condition that there is negligible difference in weight between the specimen pans used between tests.

$$E=[b/(60*Dst)][Wst*Cpst] \quad (1)$$

The SHC function of the specimen in J/(g*K) can then be determined using the difference between the baseline and ECC specimen curves (Ds), the weight of the sample (Ws), E and b.

$$Cp(s) = \frac{60*E*Ds}{Ws*b} \quad (2)$$

The resulting SHC profiles for the ECC control mix and 3% PCM-ECC are provided in FIG. 8 with solid lines representing the four test average and the dashed lines indicating the 95% confidence intervals.

We find that on average, the thermal capacitance of 3% PCM-ECC is approximately 20% higher than that of the control ECC mix. At the phase change temperature near 23° C., the capacitance peak is about 40% higher than the control ECC average and 20% greater than the background value average of PCM-ECC.

It is notable that while the vertical placement of the SHC profile of 3% PCM-ECC varied between samples, as indicated by the confidence intervals, the percent peak in specific heat capacity did not vary significantly between samples. This suggests that while the local density of the material might vary, the distribution of PCM capsules remains fairly constant. Also, the vertical shift between the 0% and 3% PCM-ECC average SHC profiles should be viewed in the context of their difference in global density. This is particularly important when using the SHC results in thermal modeling procedures, such as that described in the following section. The density of the 0% PCM-ECC and 3% PCM-ECC mixes considered in this study are 1870 kg/m³ and 1650 kg/m³, respectively, on average.

4.2 Thermal Resistance

The thermal resistance of PCM-ECC was tested in accordance with the experimental setup described in ASTM E2584-07: *Thermal Conductivity of Materials Using a Thermal Capacitance (Slug) Calorimeter*. A one-sided configuration is used in which a concrete 15 cm×15 cm×2.5 cm ECC panel is placed between a 15 cm×15 cm×1.3 cm steel slug and a heated aluminum plate. As shown in FIG. 9, the assembly is encased tightly in polystyrene insulation, greater than 25.4 mm in thickness, with an extra 12.7 mm of insulation between the steel slug and apparatus lid. A schematic of thermistor placements is shown in FIG. 10.

The steel slug is heated from room temperature, approximately 21° C., to 40° C., by heating the aluminum plate below the PCM-ECC specimen and allowing the heat to propagate upward through the ECC specimen only. This procedure requires approximately 5 hours running to completion. Temperature data is recorded by five thermistors placed between the aluminum plate and PCM-ECC specimen and four thermistors placed within holes drilled longitudinally into the steel slug.

Using the specific heat capacity of PCM-ECC determined by DSC, the temperature profile of the heated side of the specimen and that of the steel, as well as the known thermal properties of steel, we can solve for the ECC thermal resistance. The ASTM E2584-07 standard provides an equation to approximate heat-transfer across the specimen and determine this value. Further, it is also possible to use the differential equations upon which the ASTM approximation was based to solve for the concrete thermal resistance. Thus, a state space MATLAB model was constructed for this purpose to simulate heat transfer through the assembly based upon the equivalent thermal circuit model shown in FIG. 11.

All known material parameters and temperature data are provided to the model. The input temperature, $T_o$, is provided by the average value of temperature measured by the five thermistors along the heated side of the ECC specimen, as shown in FIG. 10. The thermal capacitance of the concrete specimen and the steel slug, $C_c$ and $C_s$, respectively, are obtained by multiplying the specific heat capacity (SHC) of each material by the mass of the material in the experimental setup, using the ECC density values given in the previous section. The SHC of the steel slug was obtained from the ASTM E2584-07 standard, and the SHC of the ECC specimens are obtained from DSC, as detailed in the previous section. Multiplying the specific resistance of each material by its thickness and dividing by the horizontal cross-sectional area provides the $R_c$ and $R_s$ parameters, the thermal resistance of the concrete and slug, respectively. The thermal resistance of the steel slug is obtained from the standard, while the thermal resistance of the concrete specimen is determined as described below.

Since the specific resistance of the PCM-ECC specimen is unknown, the initial value is guessed and thereafter iteratively solved for by minimizing the difference between the program output of the steel slug temperature profile, with the experimental steel slug temperature profile. The equations solved at each time step by the state space model graphically represented in FIG. 11 are given below.

$$\begin{bmatrix} \dot{T}_c \\ \dot{T}_s \end{bmatrix} = \begin{bmatrix} \frac{-2}{C_c R_c} - \frac{-2}{C_c(R_c+R_s)} & \frac{2}{C_c(R_c+R_s)} \\ \frac{2}{C_s(R_c+R_s)} & \frac{-2}{C_s(R_c+R_s)} \end{bmatrix} \begin{bmatrix} T_c \\ T_s \end{bmatrix} + \begin{bmatrix} \frac{2}{C_c R_c} \\ 0 \end{bmatrix} T_0 \quad (3)$$

For both 0% and 3% PCM-ECC, the thermal resistance test was performed on three specimens. The resulting thermal resistance, averaged over the temperature range tested, is provided in FIG. 12.

It can be seen in FIG. 12 that the thermal resistance of 3% PCM-ECC is higher than that of 0% PCM-ECC. This provides an added benefit to the use of PCM in concrete, as the phase change will delay the propagation of heat through a PCM-ECC envelope component, while the increase in thermal resistance will dissipate heat travelling through the envelope. The former provides latent heat storage, and the latter provides an insulative effect.

5. CONCLUSIONS (1) Incorporating a phase-change material into an engineered cementitious composite (ECC) increases the specific heat capacity, and therefore the passive heat storage capacity of the composite, particularly near the phase change temperature.

(2) The 3% PCM-ECC exhibits a lower density and higher thermal resistance than 0% PCM-ECC.

(3) The compressive strength of the 3% PCM-ECC composite is adversely affected by the presence of PCM, but still surpasses the 17 MPa lower bound for structural concrete mentioned by the Portland Cement Association by over 10 MPa.

(4) The presence of PCM can increase the tensile ductility of PCM-ECC if the background matrix is prepared with micromechanical characteristics which balance changes introduced by PCM inclusion.

(5) PCM-ECC is viable, thermally and mechanically, for use as a component to enhance the passive heat storage of building envelopes.

In some embodiments, it should be appreciated that thermal resistance of the material will vary widely based upon the matrix chosen, as well as characteristics such as fibers used. For example, the thermal resistance may be 2-5 times lower for concrete with coarse aggregate and metal fibers.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fiber-reinforced cementitious composite comprising:
a binder of cement, class F fly ash, and water;
a plurality of uniformly distributed oil-coated polyvinyl alcohol (PVA) or polyethylene (PE) fibers at 1.5% to 3% of the total volume;
a sand with average diameter of about 100 microns;
a microencapsulated paraffin wax that changes a state of matter at a temperature between 18 and 26 degrees Celsius; and
a water reducing admixture in sufficient quantity to obtain a mini-cone flow rate of a pre-cured fiberless matrix of the fiber-reinforced cementitious composite between 24 and 33 seconds,
wherein said composite having an ultimate tensile strength of at least 4 MPa and exhibiting a compressive strength of about 28 MPa.

2. The fiber-reinforced cementitious composite of claim 1 wherein said microencapsulated paraffin wax is not greater than about 10% of the total mass of the composite.

3. The fiber-reinforced cementitious composite of claim 1 wherein said plurality of fibers have an average diameter of 30-50 microns and an average length of 8-12mm.

4. The fiber-reinforced cementitious composite of claim 1 wherein said binder is a Portland cement.

5. The fiber-reinforced cementitious composite of claim 1 wherein said binder is a Type 1 Portland cement.

6. The fiber-reinforced cementitious composite of claim 1 wherein a weight ratio of water to binder is between 0.2 and 0.4.

7. The fiber-reinforced cementitious composite of claim 1 wherein a weight ratio of water to binder is 0.3.

8. The fiber-reinforced cementitious composite of claim 1 wherein a specific heat capacity is between 1000-2000 J/Kg.K when the composite is at temperatures below 20 or above 25 degrees Celsius and a peak specific heat capacity at 23 degrees Celsius is 20% higher than the specific heat capacity value average.

9. The fiber-reinforced cementitious composite of claim 1 wherein a thermal conductivity of the composite is 20% lower than that of a composite without said microencapsulated paraffin wax.

10. The fiber-reinforced cementitious composite of claim 1 wherein said composite has an average specific heat capacity of 1600 J/Kg.K and a peak specific heat capacity of 1900-2000 J/Kg.K at a phase change temperature of 23° C.

11. The fiber-reinforced cementitious composite of claim 1 wherein said composite having an average thermal conductivity between 0.30 and 0.50 W/m.K.

12. The fiber-reinforced cementitious composite of claim 1 wherein said composite having an ultimate tensile strength of about 4.3 MPa.

13. The fiber-reinforced cementitious composite of claim 1 wherein said composite exhibiting strain-hardening behavior resulting in a tensile strain capacity of at least 0.5%.

14. The fiber-reinforced cementitious composite of claim 1 wherein said composite exhibiting strain-hardening behavior resulting in a tensile strain capacity between 3% and 5%.

15. The fiber-reinforced cementitious composite of claim 1 wherein said composite exhibiting a density of about 1650 kg/m$^3$.

* * * * *